Patented Oct. 6, 1936

2,056,771

UNITED STATES PATENT OFFICE 2,056,771

PRODUCTION OF ESTERS OF METHACRYLIC ACID

John William Croom Crawford, Norton-on-Tees, England, assignor to Imperial Chemical Industries Limited, a corporation of Great Britain No Drawing. Application April 9, 1935, Serial No. 15,427. In Great Britain April 20, 1934

14 Claims. (Cl. 260—106)

This invention relates to an improved process for the production of methacrylic acid and/or its esters.

It has previously been proposed to produce esters of methacrylic acid by treating acetone cyanohydrin with concentrated or fuming sulphuric acid, and subsequently reacting the product with a monohydric alcohol.

I have now found that on treating acetone cyanohydrin with an alkyl hydrogen sulphate at an elevated temperature a reaction occurs which finally results in the formation of methacrylamide. On adding water to the reaction mixture containing methacrylamide and heating, combined hydrolysis and esterification occurs, resulting in the formation of alkyl methacrylates, together with a certain amount of methacrylic acid.

According to my invention, therefore, I produce methacrylic acid and/or its esters by a process which includes the step of treating acetone cyanohydrin with an alkyl hydrogen sulphate at an elevated temperature. The resulting reaction mixture is then converted into methacrylic acid and/or alkyl methacrylates by heating under reflux with water or, preferably, with a mixture of water and an alcohol. In the latter case it will be understood that if the alkyl group of the alcohol is identical to that of the alkyl hydrogen sulphate a single alkyl methacrylate will be produced, while the use of other alcohols will lead to the production of a mixture of esters.

In carrying out the reaction between the alkyl hydrogen sulphate and the acetone cyanohydrin, I find that it is preferable to use temperatures which are gradually raised to about 130° C. to 140° C. and maintained at that figure for a period not substantially more than two hours.

At least one molecular proportion of alkyl hydrogen sulphate must be used for each molecular proportion of acetone cyanohydrin, but this proportion is preferably increased considerably in order to obtain the best yields of methacrylamide. I find, however, that the use of too great an amount of the alkyl hydrogen sulphate introduces a difficulty in the subsequent hydrolysis of the reaction mixture, and that while, for example, good yields of methacrylamide can be obtained when acetone cyanohydrin is treated with three molecular proportions of methyl hydrogen sulphate, there is only a very small conversion of the methacrylamide to methacrylic acid and methyl methacrylate on subsequently heating the reaction mixture with water or with water and methanol. From my observations I believe that when the object is to produce the best yields of methacrylic acid esters, the ratio of the alkyl hydrogen sulphate to the acetone cyanohydrin should be about 1½:1.

I have also found that sulphuric acid may be used along with the alkyl hydrogen sulphate. In this case I find that it is possible to reduce the proportion of the alkyl hydrogen sulphate to acetone cyanohydrin while still obtaining excellent yields of methacrylamide and, provided that the total amount of alkyl hydrogen sulphate and sulphuric acid is not too great, very good conversions to methyl methacrylate. For example, one molecular proportion of methyl hydrogen sulphate plus half a molecular proportion of sulphuric acid to each molecular proportion of acetone cyanohydrin, has been found very suitable.

The hydrolysis and esterification of the methacrylamide produced by the above methods is suitably carried out by heating the reaction mixture with the addition of water and/or alcohol under refluxing conditions for a number of hours. Although it is possible to obtain appreciable yields of methacrylates by treating the reaction mixture with either water or an alcohol alone, I find that it is preferable to use a mixture of water and alcohol. Thus the conversion to pure methyl methacrylate of the methacrylamide in a reaction mixture when treated under otherwise identical conditions with water, alcohol and an equimolecular mixture of water and alcohol, were 65%, 66%, and 76%, respectively. It will, of course, be obvious that when preparing a particular ester of methacrylic acid the alkyl radical in the alkyl hydrogen sulphate and in the alcohol of the final treatment should be the same, although if a mixture of esters is for any reason desired, compounds with different radicals may be used.

The proportion of the hydrolyzing or esterifying medium in relation to the reaction mixture does not appear to have a critical influence on the yield of the ester and/or methacrylic acid, provided that at least about one and a half molecular proportions are used for each molecular proportion of acetone cyanohydrin originally taken. In practice somewhat more than this quantity has been found desirable and I prefer to use about two molecular proportions of an equimolecular mixture of water and alcohol. In carrying out this part of the process it is desirable that the water and/or alcohol should be heated with the reaction mixture for several hours, for example, 15 to 18 hours. Preferably I add the alcohol and water with stirring at a temperature considerably below the boiling point of the alcohol, and then heat the whole under refluxing conditions for the required time.

It will of course be evident that the methacrylates produced in the hydrolysis and esterification stage, are in admixture with excess of the reactants, other reaction products and products of side reaction. They may be recovered by distillation or by addition of water or brine. For convenience and attainment of good yields I find that the addition of a considerable amount of water is to be preferred. Usually the addition of somewhat less than an equal weight of water to the reaction mixture after refluxing causes a sharp separation of an oily layer containing the crude methacrylic acid ester and some methacrylic acid. A pure methacrylate is readily recovered from this impure product by distillation under reduced pressure, and any methacrylic acid also obtained in this step may, if desired, be esterified in a subsequent operation to increase the yield of methacrylate.

The aqueous layer remaining after separation of the methacrylate will contain the excess of reactants such as alcohol, which may be recovered by the usual well known methods.

The following examples, to which, however, the invention is not limited, are illustrative of various methods of carrying out the process, all parts being by weight:

Example 1

850 parts of acetone cyanohydrin are added gradually and with agitation to 1120 parts methyl hydrogen sulphate, while the temperature is gradually raised from 70° C. to 90° C., a small amount of copper bronze powder being present as a stabilizer. When the addition is complete the temperature is maintained at 100° C. for one hour and then at 135° C. for a further hour to complete the reaction. After this heating the reaction mass is a clear, ruby coloured liquid free from solids. It is then cooled to 65° C., 180 parts of water are added and this mixture heated for 14 hours at 95° C. under a reflux condenser. Addition of a large quantity of water then causes a sharp separation of an oily layer which is removed and washed with brine to yield 335 parts of crude methyl methacrylate.

Example 2

850 parts of 94.8% acetone cyanohydrin are added to 1680 parts of methyl hydrogen sulphate containing 2 parts of copper bronze powder at about 85° C. The temperature is raised to 100° C. and maintained at that point for about 1 hour, after which it is raised again and kept at about 130° C. for a further hour. 270 parts of water are then added and the mixture is refluxed for 18 hours at about 95° C. Separation of the oily layer after addition of water as in Example 1 shows a yield of 552 parts of crude methyl methacrylate.

Example 3

Similar quantities of crude acetone cyanohydrin, methyl hydrogen sulphate and bronze powder are used as in Example 2, the mixture being heated first for 1 hour at 75° C. to 80° C., and then for half an hour at 135° C. to 140° C. Analysis shows the conversion of acetone cyanohydrin to methacrylamide to be about 68%. 180 parts of water and 320 parts of methyl alcohol are then added and the mixture refluxed at about 96° C. for 18 hours. 600 parts of crude methyl methacrylate are recovered in a similar manner to that used in the previous examples.

Example 4

850 parts of acetone cyanohydrin (94%) are added gradually at 75° C. to 2240 parts of methyl hydrogen sulphate containing 5 parts of copper bronze powder. The temperature of the mixture is maintained at 100° C. for one hour and then at 140° C. for a further half hour. In this case the conversion of the acetone cyanohydrin to methacrylamide is 83%. 240 parts of water and 426 parts of methyl alcohol are added and refluxed at 95° C. to 100° C. for 18 hours. The yield of crude methacrylate is 500 parts.

Example 5

850 parts of crude acetone cyanohydrin containing 94% of the pure material are added gradually to a mixture of 1400 parts of methyl hydrogen sulphate and 245 parts of concentrated sulphuric acid containing 2 parts of copper bronze powder. The addition is made at about 80° C. and the mixture is then heated to about 130° C. for about eighty minutes. This results in a production of methacrylamide equivalent to 85.4% calculated on the cyanohydrin originally present. After cooling to about 50° C., 225 parts of water and 480 parts of methyl alcohol are added and the whole refluxed for 18 hours. After again cooling, 1500 parts of water are added with stirring and a crude methyl methacrylate layer of 705 parts separated.

Example 6

850 parts of acetone cyanohydrin (94%) are mixed gradually at 80° C. with 1120 parts of methyl hydrogen sulphate and 490 parts of concentrated sulphuric acid containing 2 parts of copper bronze powder. The temperature is then raised and maintained at 130° C. for two hours resulting in a conversion to methacrylamide of 87% based on the acetone cyanohydrin. The mixture is cooled to about 55° C., 180 parts of water and 480 parts of methanol are added, and the whole refluxed for 18 hours. After again cooling, 1500 parts of water are added, when 785 parts of crude methyl methacrylate are obtained.

Example 7

850 parts of pure acetone cyanohydrin are mixed slowly with 945 parts of ethyl hydrogen sulphate and 635 parts of concentrated sulphuric acid containing 5 parts of copper bronze at about 80° C. Heat is then applied to maintain the temperature at 130° C. for 1¼ hours after which the mass is cooled and 180 parts of water and 690 parts of ethyl alcohol added at 70° C. This mixture is then refluxed for 18 hours. A crude ethyl methacrylate product amounting to 940 parts is recovered by treatment with water as in the previous examples.

I claim:

1. Process for the production of methacrylic acid and the esters thereof which includes the step of treating acetone cyanohydrin with an alkyl hydrogen sulphate at an elevated temperature.

2. Process for the production of methacrylic acid and the esters thereof which consists in treating acetone cyanohydrin with an alkyl hydrogen sulphate at an elevated temperature and thereafter hydrolyzing the reaction product by heating with water.

3. Process for the production of methacrylic acid and the esters thereof which consists in treating acetone cyanohydrin with an alkyl hydrogen sulphate at an elevated temperature and thereafter hydrolyzing the reaction product by heating with an alcohol.

4. Process for the production of methacrylic acid and the esters thereof which consists in treating acetone cyanohydrin with an alkyl hydrogen sulphate at an elevated temperature and thereafter hydrolyzing the reaction product by heating with water and an alcohol.

5. Process for the production of methyl methacrylate which consists in treating acetone cyanohydrin with methyl hydrogen sulphate at an elevated temperature and thereafter hydrolyzing the reaction product by heating with water.

6. Process for the production of methyl methacrylate which consists in treating acetone cyanohydrin with methyl hydrogen sulphate at an elevated temperature and thereafter hydrolyzing the reaction product by heating with methyl alcohol.

7. Process for the production of methyl methacrylate which consists in treating acetone cyanohydrin with methyl hydrogen sulphate at an elevated temperature and thereafter hydrolyzing the reaction product by heating with water and methyl alcohol.

8. Process for the production of methacrylic acid and the esters thereof which includes the step of reacting an alkyl hydrogen sulfate and acetone cyanohydrin at a temperature ranging between approximately 130° C. and 140° C., there being present at least one molecular proportion of the alkyl hydrogen sulphate for each molecular proportion of acetone cyanohydrin.

9. The process in accord with claim 1 in which the molal ratio of the alkyl hydrogen sulphate to acetone cyanohydrin is approximately one and one-half to one.

10. The process in accord with claim 7 in which the molal ratio of methyl hydrogen sulphate to acetone cyanohydrin is approximately one and one-half to one.

11. Process for the production of methacrylic acid and the esters thereof which includes the step of treating acetone cyanohydrin with an alkyl hydrogen sulphate and sulphuric acid at an elevated temperature.

12. Process for the production of methacrylic acid and the esters thereof which includes the step of treating one mol. of acetone cyanohydrin, with one mol. of methyl hydrogen sulphate and one-half mol. of sulphuric acid at an elevated temperature.

13. Process for the production of methacrylic acid and the esters thereof which consists in treating acetone cyanohydrin with an alkyl hydrogen sulphate at an elevated temperature and thereafter hydrolyzing the reaction product by heating with a half and half water-alcohol mixture containing from one to one and one-half mols of alcohol per mol. of acetone cyanohydrin.

14. Process for the production of methyl methacrylate which comprises gradually adding 850 parts of acetone cyanohydrin to 1120 parts of methyl hydrogen sulphate and two parts of copper bronze powder while agitating and gradually raising the mixture to a temperature of from 70° C. to 90° C., when the addition is complete maintaining the temperature for the first hour at 100° C. and for the second hour at 135° C., cooling the reaction product to 65° C., adding 180 parts of water and 480 parts of methanol and refluxing the whole for 18 hours, and finally separating the crude methyl methacrylate after the addition of 1500 parts of water.

JOHN WILLIAM CROOM CRAWFORD.